(No Model.)
A. M. BABCOCK.
DEVICE FOR CONVERTING MOTION.
No. 285,372. Patented Sept. 25, 1883.
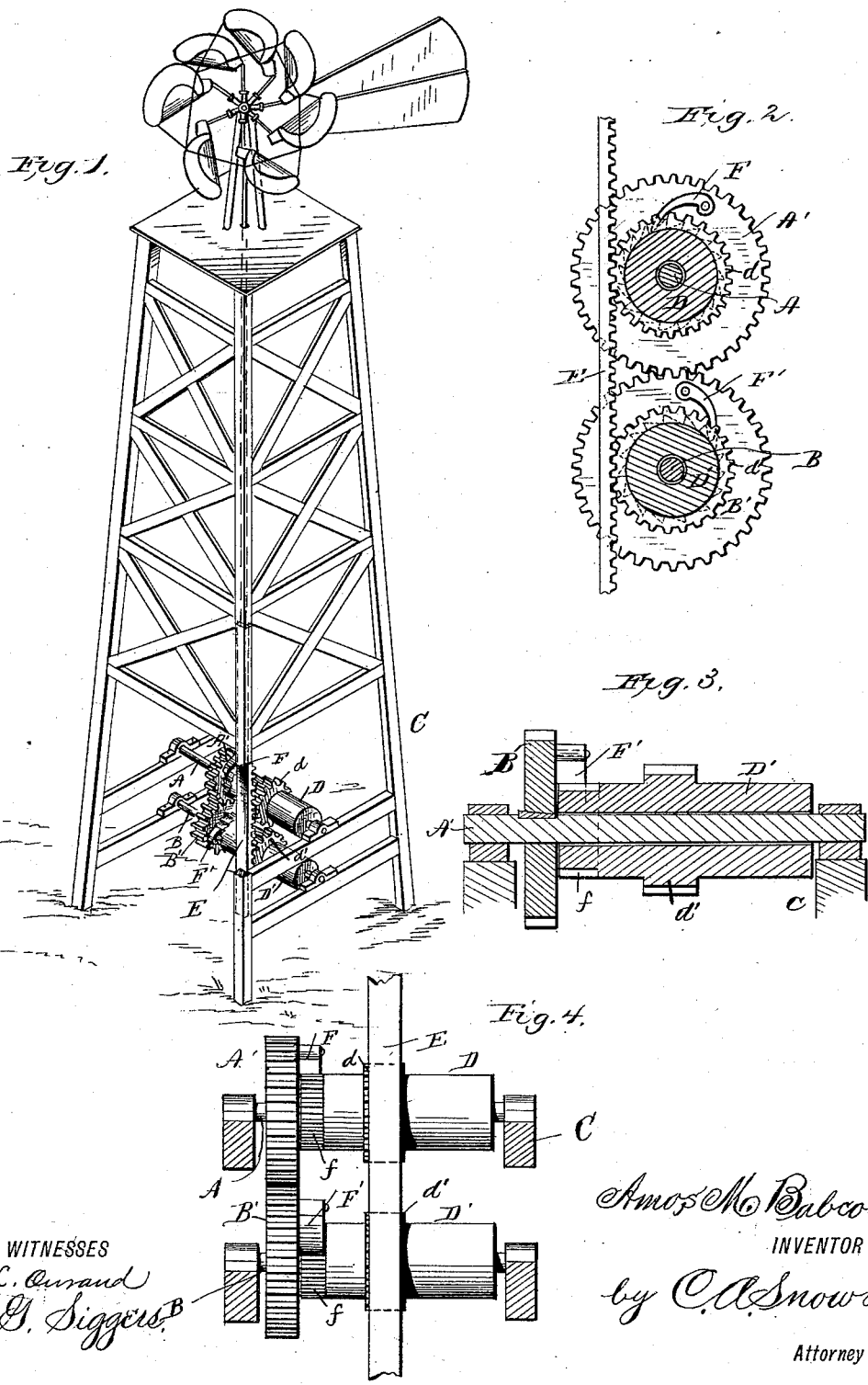
WITNESSES
F. L. Ourand
E. G. Siggers
Amos M. Babcock
INVENTOR
by C. A. Snow & Co.
Attorney

UNITED STATES PATENT OFFICE.

AMOS M. BABCOCK, OF NORA SPRINGS, IOWA.

DEVICE FOR CONVERTING MOTION.

SPECIFICATION forming part of Letters Patent No. 285,372, dated September 25, 1883.

Application filed August 7, 1883. (No model.)

*To all whom it may concern:*

Be it known that I, AMOS M. BABCOCK, a citizen of the United States, residing at Nora Springs, in the county of Floyd and State of Iowa, have invented a new and useful Device for Converting Motion, of which the following is a specification, reference being had to the accompanying drawings.

This invention relates to devices for converting motion; and it has for its object to change the reciprocating motion imparted through a pitman or otherwise into a rotary motion.

To this end it consists in certain details of construction and combination of parts, as hereinafter fully set forth, and particularly pointed out in the claims.

In the accompanying drawings, Figure 1 is a perspective view, showing my improved devices applied in position for use in connection with a windmill. Fig. 2 is a longitudinal section of the devices detached. Fig. 3 is a cross-section through one of the shafts. Fig. 4 is a front view of my improved devices.

Like letters refer to corresponding parts in all the figures.

Referring to the drawings, it will be seen that I have shown my improved devices connecting with the operating-pitman of a windmill, so that when the pitman is reciprocated it will impart a likewise movement to the rack-bar, and by means of the devices, as shown, the reciprocating movement will be converted into a rotary motion.

In said drawings, A B designate shafts journaled in the windmill-tower C, either one of said shafts connecting with the mechanism to which it is desired to impart the necessary motion. At one end of the shafts are secured gear-wheels A' B', which engage, respectively, with each other, and between the said wheels and the opposite end of the shafts A B are sleeves D D', which rotate independently of the shafts, and are provided with means, hereinafter explained, whereby said sleeves may also transmit motion to said shafts. On the sleeves D D' are gear-wheels $d$ $d'$, with which the teeth on a rack-bar, E, are adapted to engage, the rack-bar being connected in any suitable manner to the pitman of a windmill, or to any other device that transmits the necessary reciprocating motion.

F F' designate pawls secured to the inner face of gear-wheels A' B', said pawls engaging with ratchet-teeth $f$, formed on one end of the sleeves D D'.

The operation of the foregoing devices is obvious. The necessary reciprocating motion is imparted to the rack-bar E by the operation of the mechanism to which it is connected, and as the rack-bar descends it engages with the gear-wheels $d$ $d'$ on the sleeves D D'. In the downward movement the pawl F of sleeve D will be engaged with the teeth $f$ of the same, while in the upward movement the other pawl will come in action in the same manner. Thus on the downward stroke of the rack-bar the pawl F will be engaged with the teeth $f$ on the sleeve D, and said sleeve will be held from turning independently of the shaft A, and since the sleeve cannot slip, the continual engagement of the rack-bar with said sleeve will cause the latter to revolve the shaft A, which will in turn transmit motion to the other shaft, B, through the gear-wheels A' B'. In the downward movement, as the rack-bar engages with the gear-wheel $d'$ of the sleeve D', the latter will slip or rotate independently outside its shaft B, since the pawl F' will not be engaged with the teeth on said sleeve. As the rack-bar ascends these movements of the sleeves will be reversed. The pawl F of sleeve D will not be engaged with the gear-wheel $d$ in the upward movement of the rack-bar. Therefore the sleeve D will be permitted to revolve outside its shaft A, while the pawl F' of the other sleeve, D', being engaged therewith, the sleeve cannot rotate independently of its shaft, but must necessarily revolve the shaft B also. This shaft will, by means of the gear-wheels B' A', transmit motion to the other shaft, A, and thus as the rack-bar is operated the reciprocating movement of said bar will be changed into the rotary motion of the shafts.

A sliding bar provided with projections engaging with openings in the sleeves D D' may be substituted for the rack-bar E, as found desirable.

The operation of my improved devices is efficient, while the means employed is simple, durable, and inexpensive. Since there is no catch-center or center point, there will be no hitching in the operation, while the parts will all work true.

It is obvious that various modifications may be resorted to without departing from the spirit or scope of my invention, while it will also be apparent that the devices shown may be used to transmit a reciprocating motion from any suitable power and change or convert it to a rotary motion, which can be used to turn any desired mechanism.

Having described my invention, I claim as new—

1. In a device for converting motion, the rack-bar connecting with the operating machinery, in combination with shafts carrying revolving sleeves adapted to rotate independently of the shafts, gear-wheels on the ends of the shafts engaging with each other, and means, substantially as described, for permitting the revolution of one sleeve while the other sleeve is held from turning independently, for the purpose set forth.

2. In a device for converting motion, the rack-bar connecting with the operating machinery, in combination with a pair of shafts, gear-wheels on the ends of the shafts engaging with each other, sleeves on said shafts rotating independently of the same, pawls adapted to engage with ratchet-teeth on the ends of the sleeves, said pawls acting to alternately hold said sleeves from turning, as set forth.

3. The shafts A B, carrying gear-wheels at one end engaging with each other, and sleeves D D' on said shafts, provided with gear-wheels $d\ d'$, in combination with a rack-bar engaging with the gear-wheels $d\ d'$, and pawls F F', adapted to engage with ratchet-teeth on the ends of the sleeves, substantially as set forth.

In testimony that I claim the foregoing as my own I have hereto affixed my signature in presence of two witnesses.

AMOS M. BABCOCK.

Witnesses:
JOHN SHOOK,
JOHN HOLLENBECK.